# 3,506,699
HETEROCYCLIC COMPOUNDS CONTAINING HETERO SULFUR AND SILICON ATOMS

Richard V. Viventi, Schenectady, N.Y., assignor to General Electric Company, a corporation of New York
No Drawing. Filed Nov. 2, 1967, Ser. No. 679,992
Int. Cl. C07d *103/02;* C07f *7/04;* C07h *7/18*
U.S. Cl. 260—448.8                                                          2 Claims

ABSTRACT OF THE DISCLOSURE

Heterocyclic silanes having the formula:

are prepared by reacting sodium hydrosulfide in dimethylformamide with an appropriate chloroalkylsilane. In the formula, R is a member selected from the class consisting of lower alkyl radicals and monocyclic aryl radicals, R' is a lower alkyl radical, $a$ is a whole number equal to from 0 to 1, inclusive, $n$ is an integer equal to from 1 to 2, inclusive. The heterocyclic organosilanes are useful as silver and copper protectants.

---

This invention relates to heterocyclic organosilanes and their preparation. In particular, this invention relates to heterocyclic organosilanes having the formula:

(1)          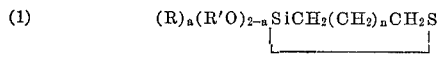

where R is a member selected from the class consisting of lower alkyl radicals and monocyclic aryl radicals; R' is a lower alkyl radical, $a$ is a whole number equal to from 0 to 1, inclusive, and $n$ is an integer equal to from 1 to 2, inclusive. This invention also relates to the preparation of such heterocyclic silanes by reacting an appropriate chloroalkylsilane with sodium hydrosulfide. From the above formula, it is seen that the heterocyclic silanes of the present invention contain 5 or 6 atoms in the ring, including a silicon atom adjacent to a sulfur atom, and 3 or 4 adjoining carbon atoms. These silanes also contain one or two silicon-bonded lower alkoxy grups and up to one lower alkyl or monocyclic aryl radical. Illustrative of the radicals represented by R of Formula 1 are the lower alkoxy radicals, by which is meant alkyl radicals containing from 1 to 7 carbon atoms, and monocyclic aryl radicals such as phenyl, xylyl, tolyl, etc., with the preferred radicals represented by R being methyl and phenyl, with methyl being the preferred specific radical. The lower alkyl radicals within the scope of R' are identical to those within the scope of R and, again, the preferred radical represented by R' is methyl.

The heterocyclic silanes within the scope of Formula 1 are prepared from chloroalkylsilanes having the formula:

(2)          $(R)_a(R'O)_{3-a}SiCH_2(CH_2)_nCH_2Cl$ where R, R', $a$ and $n$ are as previously defined. Illustrative of the specific compounds within the scope of Formula 2 are chloropropyltrimethoxysilane, chloropropylmethyldimethoxysilane, delta-chlorobutyltriethoxysilane, delta-chlorobutyl phenyldimethoxysilane. The reaction of the present invention is effected by reacting the chloroalkylsiloxane of formula 2 with sodium hydrosulfide (NaSH) in dimethylforamide at an elevated temperature. While the exact mechanism of the reaction is not known with certainty, it would not be predicted that the reactants described above would result in the heterocyclic silane of formula 1. However, it has been found that the reaction of the chloroalkylsilane of formula 2 with the sodium hydrosulfide in dimethylformamide results in the formation of sodium chloride, the product and the alcohol corresponding to the silicon-bonded lower alkoxy groups in the product of Formula 1.

In effecting the reaction between the chloroalkylsilane of Formula 1 and the sodium hydrosulfide, the reaction calls for equimolar amounts of the two reactants. However, it is found that the reaction is facilitated by employing an excess of the sodium hydrosulfide and, in the preferred method of preparing the compositions of the present invention, for each mole of the chloroalkylsilane of Formula 2 from about 1.1 to 2 moles of sodium hydrosulfide are employed.

The amount of dimethylformamide employed in the reaction again can vary within wide limits, since this material is a solvent, but generally it is found convenient to employ relatively large excesses of the dimethylformamide. For example, the dimethylformamide can be employed in as little as 2 parts by weight to as much as 20 parts by weight of the other reactants in the reaction mixture. In general, very satisfactory results are obtained when the dimethylformamide is present in an amount equal to from about 75 to 125 parts by weight per 100 parts of the other reactants.

It is often found that the presence of a moderately low boiling solvent facilitates the reaction. This is particularly true since sodium hydrosulfide contains water of crystallization which should be removed from the reaction mixture. A satisfactory method of removing this water from the reaction mixture is to employ a solvent such as toluene which is useful in the azeotropic distillation of water of hydration from the reaction mixture. The solvent can generally be present in the amount equal to about 50 percent of the weight of the dimethylformamide.

To effect the reaction, the sodium hydrosulfide, which can be either the dihydrate or the trihydrate, is mixed with the toluene and the reaction mixture is distilled to remove water as an azeotrope with the toluene. Then the dimethylformamide is added in total or in major part and the reaction mixture is maintained at a temperature of about 95 to 135° C. while the chloroalkylsilane of Formula 2 is slowly added over a one to two hour period, along with any remaining dimethylformamide. The reaction mixture is then refluxed for about 2 to 10 additional hours and the toluene, the dimethylformamide, and any alcohol formed during the reaction is stripped from the reaction mixture. The sodium chloride precipitate is filtered from the reaction mixture and the resulting product is fractionally distilled to produce the heterocyclic silane of Formula 1.

The heterocyclic silanes of Formula 1 are useful as metal protectants for preventing the corrosion of copper or silver surfaces. To employ these silanes as copper or silver protectants, the silanes are dissolved in a suitable low boiling solvent, such as methanol or ethanol, to a concentration of about 1 to 4 weight percent. The copper or silver article which is to be protected is added to this solution, the solvent is permitted to evaporate from the surface, leaving the silane of Formula 1 or a reaction product formed by reaction between such silane and such metal surface or between such silane and water from the atmosphere. It is found that surfaces of copper or silver treated in this fashion will resist tarnish and corrosion for an extended period of time.

The following examples are illustrative of the practice of my invention and are not intended for purposes of limitation.

EXAMPLE 1

To a reaction vessel is added 2240 grams of a commercial flaked sodium hydrosulfide containing approximately 28% by weight water (about 28 moles sodium hydrosulfide) and 2 liters toluene. An azeotrope of toluene and water is then distilled from the reaction mixture to dry the reaction mixture. Then to the reaction vessel is then added 2 liters dimethylformamide and the reaction mixture is heated to a temperature of 95° C. At this time, the addition of 3664 grams (20 moles) of gamma-chloropropylmethyldimethoxysilane is begun and approximately 1.5 hours is allowed for the addition. At the end of this time, an additional liter of dimethylformamide is added to the reaction vessel and the temperature of the reaction mixture is gradually increased over an 8 hour period to 135° C. During this additional heating, an additional liter of dimethylformamide is added to the reaction mixture. At the end of the reaction period, the reaction mixture is stripped of toluene, dimethylformamide, and any methanol remaining in the reaction mixture, sodium chloride is filtered and the product is fractionally distilled to produce 1513 grams of a heterocyclic silane having the formula:

(3) $(CH_3)(CH_3O)SiCH_2CH_2CH_2S$
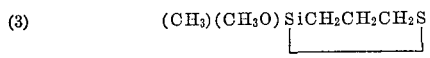

which is a clear, colorless liquid having a boiling point of 58.4° C. at 7.2 mm. mercury. Analysis of this product shows the presence of 41.84% carbon, 8.77% hydrogen, 19.44% sulfur, and 17.54% silicon as compared with theoretical values of 40.49% carbon, 8.16% hydrogen, 21.62% sulfur, and 18.9% silicon. Molecular weight by acetylation is determined to be 148 as compared with the theoretical value of 148.3 Percent sulfur by mercuric acetate analysis is 22.0% as compared with the theoretical value of 21.62%. This compound is within the scope of Formula 1 when $a$ is 1, $n$ is 1, and R and R' are both methyl.

EXAMPLE 2

Following the procedure of Example 1, 92 grams of the dihydride of sodium hydrosulfide (1.0 mole) and 250 grams of toluene are added to a reaction vessel and the reaction vessel is heated to distill off an azeotrope of the water of hydration and toluene. After the reaction mixture is dried, 400 grams of dimethylformamide are added and the reaction mixture is heated to 100° C. While maintaining the reaction mixture at this temperature, 215 grams (0.75 mole) of delta-chlorobutylphenyldiethoxysilane are slowly added to the reaction mixture. After the addition is completed, an additional 300 grams of dimethylformamide is added and the reaction mixture is maintained at a temperature of 100° C. for 5 hours. During this time, ethyl alcohol is distilled from the reaction mixture. At the end of this time, the reaction mixture is then stripped of toluene and dimethylformamide, cooled to room temperature, filtered of sodium chloride, and then fractionally distilled to produce the heterocyclic silane having the formula:

(4) $(C_6H_5)(C_2H_5O)SiCH_2CH_2CH_2CH_2S$
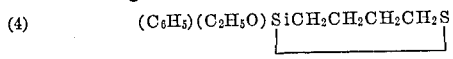

This liquid silane is within the scope of Formula 1 when R is phenyl, R' is ethyl, $a$ is 1, and $n$ is 2.

EXAMPLE 3

Following the procedure of preceding examples, a reaction vessel is charged with 330 grams (3 moles) of the trihydride of sodium hydrosulfide and 220 grams of toluene. Water is azeotroped from the reaction mixture and then 530 grams (7.3 moles) of dimethylformamide are added. While the reaction mixture is maintained at room temperature, 496 grams (2.5 moles) of gamma-chloropropyltrimethoxysilane are added over a 1 hour period. The reaction mixture is gradually brought to a temperature of 110° C. over a 3 hour period, during which time a substantial amount of methanol boils from the reaction mixture. At the end of 4 additional hours at 115–125° C., the reaction mixture is stripped of toluene and dimethylformamide, sodium chloride precipitate is filtered and the product is fractionally distilled to produce a heterocyclic silane having the formula:

(5) $(CH_3O)_2SiCH_2CH_2CH_2S$
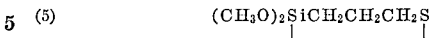

This product is within the scope of Formula 1 when $a$ is 0, R' is methyl, and $n$ is equal to 1.

EXAMPLE 4

To 100 parts of an equal volume mixture of methanol and isopropanol is added 3 parts of the heterocyclic silane prepared in Example 1. A two inch square test panel of silver is dipped into this solution and air-dried to evaporate the solvent and then heated in a circulating air oven at 100° C. to evaporate any remaining solvent. An untreated control sheet of silver and the treated sheet are both maintained in an industrial atmosphere for a period of one month. During this time, the untreated control tarnishes to a black color, while no noticeable change is observed in the treated material.

While the foregoing examples have illustrated a number of the embodiments of my invention, my invention relates broadly to the heterocyclic organosilanes of the type previously described, including those in which the substituents are other than those specifically illustrated in the foregoing examples. These materials are useful for tarnish prevention of both copper and silver and, therefore, represent a significant advance in the art.

What I claim as new and desire to secure by Letters Patent of the United States is:

1. A method for forming a cyclosilane of the formula, $(R)_a(R'O)_{2-a}SiCH_2(CH_2)_nCH_2S$
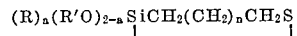

which comprises heating a solution of a chloroalkylsilane having the formula, $(R)_a(R'O)_{3-a}SiCH_2(CH_2)_nCH_2Cl$ and sodium hydrosulfide in the presence of dimethylformamide and isolating said cyclic organosilicon compound, where R is a member selected from the class consisting of lower alkyl and phenyl radicals, R' is a lower alkyl radical, $a$ is a whole number equal to from 0 to 1, inclusive, and $n$ is an integer equal to from 1 to 2, inclusive.

2. A process for forming the composition of claim 1 having the formula, $(CH_3)(CH_3O)SiCH_2CH_2CH_2S$

which comprises heating to a temperature of about 95 to 135° C., a solution of chloropropylmethyldimethoxysilane and sodium hydrosulfide in dimethylformamide and isolating the desired product by fractional distillation.

References Cited

UNITED STATES PATENTS

| | | | |
|---|---|---|---|
| 2,888,454 | 5/1959 | Bailey | 260—448.8 XR |
| 2,983,744 | 5/1961 | Knoth | 260—448.2 |
| 3,313,837 | 4/1967 | Rossmy et al. | 260—448.8 |
| 3,417,121 | 12/1968 | Koerner | 260—448.2 |

OTHER REFERENCES

Fuson, "Advanced Organic Chemistry," (1950), Wiley & Sons, Inc., New York, p. 122.

TOBIAS E. LEVOW, Primary Examiner

P. F. SHAVER, Assistant Examiner

U.S. Cl. X.R.

106—14